United States Patent
Rácz et al.

(10) Patent No.: US 9,325,568 B2
(45) Date of Patent: Apr. 26, 2016

(54) TECHNIQUE FOR DETERMINING CORRELATED EVENTS IN A COMMUNICATION SYSTEM

(75) Inventors: András Rácz, Budapest (HU); Edwin Tse, Montreal (CA); András Veres, Budapest (HU); Oscar Zee, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 225 days.

(21) Appl. No.: 13/984,354

(22) PCT Filed: Mar. 3, 2011

(86) PCT No.: PCT/EP2011/001060
§ 371 (c)(1),
(2), (4) Date: Oct. 23, 2013

(87) PCT Pub. No.: WO2012/116716
PCT Pub. Date: Sep. 7, 2012

(65) Prior Publication Data
US 2014/0219107 A1    Aug. 7, 2014

(51) Int. Cl.
*H04L 12/26* (2006.01)
*H04L 12/24* (2006.01)
*H04L 29/06* (2006.01)

(52) U.S. Cl.
CPC ........ *H04L 41/0631* (2013.01); *H04L 41/0686* (2013.01); *H04L 63/1416* (2013.01)

(58) Field of Classification Search
None
See application file for complete search history.

(56) References Cited

U.S. PATENT DOCUMENTS 6,810,427 B1 * 10/2004 Cain et al. ............... 709/238
6,993,784 B1 *  1/2006 Shinotsuka ................ 725/74

(Continued)

FOREIGN PATENT DOCUMENTS

| CN | 101317370 A | 12/2008 |
|---|---|---|
| EP | 1521396 A2 | 4/2005 |
| WO | 2006057588 A1 | 6/2006 |

OTHER PUBLICATIONS

Author Unknown, "Information Technology—Open Systems Interconnection—Systems Management: Alarm Reporting Function," International Telecommunication Union; The International Telegraph and Telephone Consultative Committee; CCITT; X.733. 1992. pp. 1-22. Geneva, Switzerland.

(Continued)

*Primary Examiner* — Ian N. Moore
*Assistant Examiner* — Phong La
(74) *Attorney, Agent, or Firm* — Murphy, Bilak & Homiller, PLLC

(57) ABSTRACT

A technique for determining a correlation among events occurring in one or more network elements is provided. The correlation among the events results from a propagation of a root event through communication entities of the one or more network elements. In a method implementation the technique comprises the step of receiving a plurality of event messages from one or more network elements, wherein an event message pertaining to an event reported by a particular network element signals an occurrence context, the occurrence context comprising one or more context identifiers describing an internal communication state of the communication entity in which the event occurred at the time when the event occurred. In another step, a set of correlated events linked by identical context identifiers is determined. Based on the set of correlated events, the root event may be identified.

25 Claims, 10 Drawing Sheets

(56) References Cited

U.S. PATENT DOCUMENTS

| | | | |
|---|---|---|---|
| 7,107,496 B1 * | 9/2006 | D'Ippolito et al. | 714/46 |
| 7,500,142 B1 * | 3/2009 | Cowart et al. | 714/25 |
| 7,733,767 B2 | 6/2010 | Granath | |
| 8,320,261 B2 * | 11/2012 | Vasamsetti et al. | 370/242 |
| 2004/0233907 A1 * | 11/2004 | Hundscheidt et al. | 370/390 |
| 2007/0036083 A1 * | 2/2007 | Wilson et al. | 370/242 |
| 2007/0177523 A1 * | 8/2007 | Nagami et al. | 370/252 |
| 2007/0220162 A1 * | 9/2007 | Levin et al. | 709/231 |
| 2008/0080384 A1 * | 4/2008 | Atkins et al. | 370/252 |
| 2008/0232376 A1 * | 9/2008 | Huang et al. | 370/395.3 |
| 2009/0052329 A1 * | 2/2009 | Mahajan et al. | 370/242 |
| 2011/0122866 A1 * | 5/2011 | Vasamsetti et al. | 370/352 |

OTHER PUBLICATIONS

Chisolm, S. et al., "Alarm Management Information Base (MIB)," Network Working Group; Request for Comments: 3877; Category: Standards Track. Sep. 2004. pp. 1-76.

3RD Generation Partnership Project, "3GPP TS 32.111-2 V11.1.0 (Dec. 2012)," 3rd Generation Partnership Project; Technical Specification Group Services and System Aspects; Telecommunication management; Fault Management; Part 2: Alarm Integration Reference Point (IRP): Information Service (IS) (Release 11). Dec. 2012. pp. 1-68.

3RD Generation Partnership Program, "3GPP TS 32.404 V11.0.0 (Sep. 2012)," 3rd Generation Partnership Project; Technical Specification Group Services and System Aspects; Telecommunication management; Performance Management (PM); Performance measurements; Definitions and template (Release 11). Sep. 2012. pp. 1-29.

3RD Generation Partnership Project. 3GPP TS 32.111-2 V10.0.0 (Dec. 2010). 3rd Generation Partnership Project; Technical Specification Group Services and System Aspects; Telecommunication management; Fault Management; Part 2: Alarm Integration Reference Point (IRP): Information Service (IS) (Release 10). Dec. 2012, pp. 1-64.

* cited by examiner

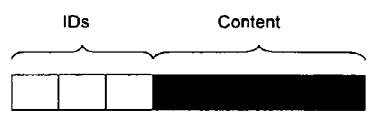
Fig. 6A
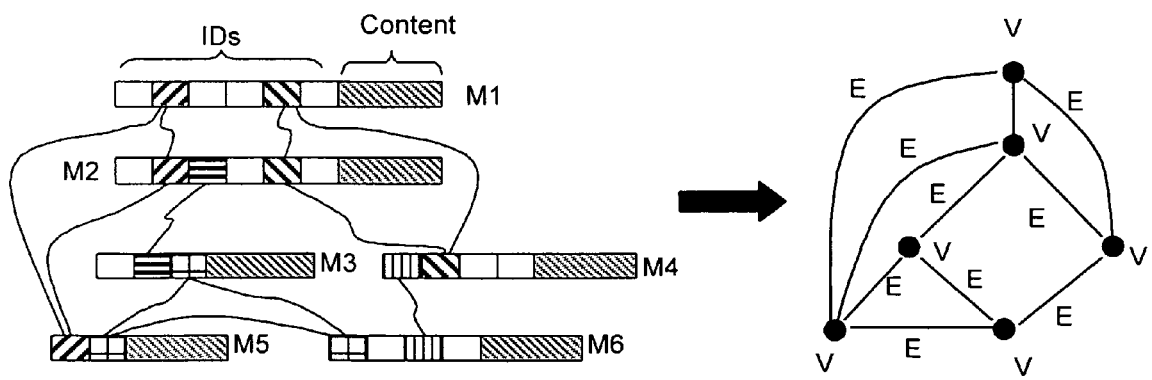
Fig. 6B  Fig. 6C

| Attribute name |
|---|
| alarmed |
| objectClass |
| objectInstance |
| notificationId |
| alarmRaisedTime |
| alarmClearedTime |
| alarmChangedTime |
| eventType |
| probableCause |
| perceivedSeverity |
| specificProblem |
| backUpObject |
| backedUpStatus |
| trendIndication |
| thresholdInfo |
| stateChangeDefinition |
| monitoredAttributes |
| proposedRepairActions |
| additionalText |
| additionalInformation |
| ackTime |
| ackUserId |
| ackSystemId |
| ackState |
| clearUserId |
| clearSystemId |
| serviceUser |
| serviceProvider |
| securityAlarmDetector |
| contextIds |

Fig. 9

| Attribute name |
|---|
| Description |
| Collection Method |
| Condition |
| Measurement Result (measured value(s), Units) |
| Measurement Type |
| Measurement Object Class |
| Switching Technology |
| Generation |
| Purpose |
| ContextIds |

Fig. 10

TECHNIQUE FOR DETERMINING CORRELATED EVENTS IN A COMMUNICATION SYSTEM

TECHNICAL FIELD

The present disclosure generally relates to the determination of a correlation among events that occur in one or more network elements of a communication system. The correlation of the events results from a propagation of a root event through communication entities of the one or more network elements.

BACKGROUND

In modern communication systems, network elements are equipped with fault management functionalities that involve the generation of an alarm upon detecting some malfunctioning. When a fault occurs in a communication entity of a network element (e.g., in a protocol layer), the services provided by the communication entity may be degraded or blocked completely. As a result, other communication entities of the network element and/or other network elements relying on such services will also exhibit fault symptoms and may start generating alarms themselves. Consequently, one single fault may propagate through a larger part of the communication system and give rise to a high number of correlated alarms.

FIG. 1 schematically illustrates the propagation of a fault through different protocol layers (L1 to L7) of an individual network element as well as through different network elements (NE1 to NE3). In FIG. 1, it is assumed that the fault occurs in L2 of NE3 and that an alarm will thus be generated by L2. Due to this fault in L2, the services provided by L2 to L3 of NE3 will be blocked, so that also L3 of NE3 will not be able to function properly (as it relies on the services of L2). Thus, L3 of NE3 will generate an alarm itself. The same mechanism will happen between L3 and L4 of NE3, and between all higher protocol layers of the protocol stack of NE3. Consequently, the fault that has occurred in L2 propagates "upwards" in the protocol stack of NE3. Such a fault propagation within a single network element will in the following be referred to as "vertical" fault propagation (of course, the fault could also vertically propagate "downwards" in the protocol stack).

A fault in an individual network element such as NE3 could also propagate to one or more network elements on a peer side of the faulty network element as illustrated in FIG. 1 for network elements NE1 and NE2. As shown in FIG. 1, the fault in L2 of NE3 will result in a malfunctioning of the corresponding L2 of the peers NE1 and NE2 of NE3, so that NE1 and NE2 will generate alarms themselves. Such a fault propagation among communicating network elements will in the following also be referred to as "horizontal" fault propagation. Is should be noted that the horizontal fault propagation may in turn give rise to a vertical fault propagation as illustrated in FIG. 1 for NE1.

The purpose of alarm correlation is to find a relation between alarms that are caused by the same fault ("root fault") and trace back the alarms to the alarm ("root alarm") generated in direct response to the root fault. Since in larger communication networks hundreds of alarms may be active in parallel in any given moment, it is not an easy task to identify the one or more root alarms in a long alarm list. It should also be noted that the temporal order of the alarms typically does not correspond to the logical order in which the correlated faults have occurred. This lack of correspondence can be attributed to different triggering thresholds for alarm generation in different communication entities (in the example of FIG. 1, the L2 alarm in NE3 may be preceded by the L3 alarm in NE3) and in different network elements (in the example of FIG. 1, the L2 alarm of NE1 may be preceded by the L2 alarm of NE2).

To find a correlation among a plurality of alarms, the content of the respective alarm messages can be analyzed. Alarm message specifications are available for a large number of different communication systems. For communication systems according to the 3$^{rd}$ Generation Partnership Project (3GPP), the content and format of alarm messages is defined, inter alia, in Technical Specification (TS) 32.111-2 V.10.0.0 (2010-12); Fault Management; Part 2: Alarm Integration Reference Point (IRP): Information Service (IS). In section 5.3.1.2 of this TS, different alarm attributes that may be signalled in an alarm message are listed. The alarm attributes include information about the time when the alarm was raised, about a probable alarm cause and about proposed repair actions. However, the information derivable from the alarm attributes is confined to the network element reporting the alarm. As a result, it is rather difficult to find relations among alarms generated by different network elements.

WO 2006/057588 A1 discloses a technique for correlating alarms generated by different network elements that have a client-server-relationship. A serving network element that locally detects a fault generates a Fault Identifier (FID) in the form of a randomly generated number. The faulty serving network element reports the resulting fault together with the FID via a first alarm message to a network management system. Additionally, the serving network elements informs its client network elements of the service loss or degradation via traffic messages to which the FID is appended. Each client network element extracts the FID from the traffic message and appends it to a further alarm message that is also sent to the network management system. Since the same FID is reported to the network management system via alarm messages generated by the faulty serving network element on the one hand and the client network elements effected by the fault on the other, the network management system can correlate the resulting alarm messages.

One drawback of the correlation approach presented in WO 2006/057588 A1 is the fact that it requires signalling for each fault via dedicated traffic messages between the serving network element and the served network elements to propagate the FID. Additionally, there has to be pre-established client-server-relationship so as to permit the serving network element a determination of the client network elements that need to be contacted via traffic messages in case of a fault.

SUMMARY

Accordingly, there is a need for an approach that permits an efficient determination of a correlation among alarms or other events occurring in a communication system.

According to a first aspect, a method of determining a correlation among events occurring in one or more network elements is provided, wherein the correlation among the events results from a propagation of a root event through communication entities of the one or more network elements. The method comprises receiving a plurality of event messages from one or more network elements, wherein an event message pertaining to an event reported by a particular network element signals one or more context identifiers describing an internal communication state of the communication entity in which the event occurred at the time when the event occur. The method further comprises determining a set of correlated events linked by identical context identifiers.

In one scenario, the root event vertically propagates through communication entities of a single network element. In another scenario, the root event horizontally propagates through communication entities of two or more individual network elements. According to a third scenario, the root event propagates both vertically and horizontally.

As understood herein, a communication entity constitutes a hardware entity and/or software entity in which an event reported by a specific event message has occurred. A communication entity may constitute a component (e.g., a software component and/or a hardware component) of a network element, for example in vertical fault propagation scenarios. In certain cases, for example in horizontal fault propagation scenarios, the network element as such may be regarded as the communication entity.

Each context identifier may comprise one or more multiple parameters. In one implementation, each context identifier comprises at least a first parameter and a second parameter, wherein the first parameter is indicative of a context type and the second parameter is indicative of an associated identification value. As an example, the context identifier may comprise a name/value pair, wherein the name is indicative of a context type and the value is indicative of an associated (e.g., numerical or alphanumerical) identifier value such as an address or an ID.

Two events may be determined to be correlated when the associated event messages are directly or indirectly linked via one or more identical context identifiers. As an example, two events may be determined to be correlated when the associated event messages comprise at least one context identifier of the same context type and with the same identification value.

At least one of the event messages may indicate two or more context identifiers pertaining to the event. In such a case, two events may be determined to be correlated when the associated event messages are linked via a chain comprising one or more intermediate event messages via pairs or sets of identical context identifiers. As an example, a link between two event messages (that may comprise at least one intermediate event message) may be defined by at least one context identifier of the same context type and with the same identification value in the two event messages.

As mentioned above, an internal communication state of a particular communication entity is described by an occurrence context comprising one or more context identifiers included in a particular event message. The communication state may, for example, relate to certain communication parameters, including address information and/or identifier information, regarding local or remote components currently involved in the communication.

The internal communication state of the communication entity may be described by one or more context types. Such context types may include one or more of the user context, a network cell context and at least one of a network element context, a network element component context, a network interface context, a network protocol context and a vendor specific container context (either on a side of the reporting network element or on a peer side thereof). For each context a unique identification value (e.g., a numerical or alphanumerical identifier or an address) may be defined that allows to distinguish different contexts at least locally (e.g., within a particular network element or set of associated network elements).

The single context identifier or, in the case of an event message comprising multiple identifiers, at least one of the context identifiers may relate to a communication entity not included in or different from the network element reporting the event. As an example, such a context identifier may relate to a communication entity of a network element located on peer side of the network element reporting the event. Between the two peer network elements a communication link may be established.

In one implementation, the event message reported by a specific network element includes at least one first context identifier relating to a first communication entity of the reporting network element and at least one second context identifier relating to a second communication entity of the network element on the peer side. Information regarding the second context identifier relating to the peer side may be obtained in various ways. As an example, such information may be obtained by the reporting network element during at least one of a context setup process and a configuration process from a central network management entity. Alternatively, or in addition, such information may be obtained by the reporting network element during a context exchange process from the network element on the peer side.

In another implementation, an event message received from a reporting network element may include at least one first context identifier relating to a first communication entity of the reporting network element and optionally no second context identifier relating to a second communication entity of the network element on the peer side. In such a case the at least one second identifier relating to the second communication entity of the network element on the peer side may be determined in response to receipt of the event message. The determination of the at least second context identifier may be based on stored configuration information. As an example, the second context identifier may be determined by a look-up process in a configuration database based on the at least one first context identifier received in the event message.

In one variant, at least one root event among the correlated events may be determined. The determination of the root event may be performed in various ways. In one example, a correlation graph is generated for the set of correlated events. The correlation graph comprises vertices and edges connecting the vertices, wherein each vertex represents a particular event and each edge represents a correlation between the events represented by the connected vertices. An edge is added between two vertices if there is at least one identical context identifier associated with the two events. Once the graph has been generated, it may analysed to determine at least one root vertex. In a subsequent step, the at least one root event among the correlated events may be determined based on the at least one root vertex. As an example, each root vertex may correspond to a root event.

The correlation graph may have directed vertices. To this end, in a first step, an undirected graph may be generated from the set of correlated events. In a second step, directions may be added to the vertices by applying a set of rules to the undirected graph. Each rule may specify an order of an occurrence relationship between two events. Moreover, the event messages may indicate temporal occurrence information. In such a case, the vertex directions may be derived from the temporal occurrence information.

The correlation graph may also be generated taking into account correlation strengths determined for pairs of correlated events. In such an implementation, weights may be added to at least one of the vertices and edges of the correlation graph based on the correlation strengths. The correlation strengths may be determined, for example, based on communication parameters.

A communication entity may be represented by a network element or any a network element component, including a network protocol layer, a network interface or any other software or hardware aspect. When an event message is reported by a network element, it may either be reported by the network element as such or by any communication entity thereof.

The events for which a correlation is to be determined may relate to various network-related aspects. As such, the events may include at least one of alarm events and performance events. In particular, the set of correlated events linked by identical context identifiers may comprise both one or more alarm events and one or more performance events. The performance events may comprise at least one of a counter and a key performance indicator. Information regarding the performance events may be derived from corresponding event messages and/or from stored performance measurement data.

According to a further aspect, a method of generating an event message enabling determination of a correlation among events occurring in one or more network elements is provided, wherein the correlation among the events results from a propagation of a root event through communication entities of the one or more network elements. The method is carried out in a network element and comprises detecting an occurrence of an event in a first communication entity of the network element, determining one or more context identifiers describing an internal communication state of the first communication entity at the time when the event occurred, generating an event message configured to signal the one or more context identifiers, and reporting the event message towards a central network management entity.

The event message reported by the network element may include at least one first context identifier relating to the first communication entity of the reporting network element and at least one second context identifier relating to a second communication entity of a network element on a peer side of the reporting network element.

Moreover, information regarding the second context identifier relating to the peer side may have been obtained by the reporting network element during at least one of a context setup process and a configuration process from a central network management entity, or a context exchange process from the network element on the peer side.

The at least one context identifier may be inserted in various information objects. Such information objects include an AlarmInformation record object in accordance with the 3GPP specifications. Alternatively, or in addition, the at least one context identifier may be inserted in a performance measurement record object in accordance with the 3GPP specifications. The step of generating the event message may in such a case comprise inserting the resulting object in the event message.

According to a further aspect, a computer program product is provided. The computer program product comprises program code portions for performing one or more of the steps of one or more of the method aspects described herein when the computer program product is run or executed on a computing device. The computer program product may be stored on a computer-readable recording medium such as a permanent or re-writeable memory, a CD-ROM, or a DVD. The computer program product may also be provided for download via a computer network such as the Internet, a mobile communication network or a wireless or wired Local Area Network (LAN).

According to another aspect, an apparatus for determining a correlation among events occurring in one or more network elements is provided, wherein the correlation among the events results from a propagation of a root event through communication entities of the one or more network elements. The apparatus comprises an interface adapted to receive a plurality of event messages from one or more network elements, wherein an event message pertaining to an event reported by a particular network element signals one or more context identifiers describing an internal communication state of the communication entity in which the event occurred at the time when the event occurred. The apparatus further comprises a processor adapted to determine a set of correlated events linked by identical context identifiers.

Also provided is an apparatus for generating an event message enabling determination of a correlation among events occurring in one or more network elements, wherein the correlation among the events results from a propagation of a root event through communication entities of the one or more network elements. The apparatus comprises a detector adapted to detect occurrence of an event in a communication entity of the network element, and a processor adapted to determine one or more context identifiers describing an internal communication state of the communication entity in which the event occurred at the time when the event occurred, wherein the processor is further adapted to generate an event message configured to signal the one or more context identifiers. The apparatus also comprises an interface adapted to report the event message towards a central network component.

A correlation determination system comprises at least one apparatus for determining a correlation among events as well as a plurality of apparatuses for generating an event message as discussed herein. The apparatus for determining a correlation may be a central network management entity. The central network management entity may be located in a core network portion of a communication system. The apparatuses for generating an event message may be located in the core network portion, in an access network portion or in terminals of the communication system.

The individual apparatuses may be configured to implement any of the methods, functions and steps disclosed herein.

BRIEF DESCRIPTION OF THE DRAWINGS

Further aspects, details and advantages of the technique presented herein will become apparent from the following description of exemplary embodiments in combination with the drawings, wherein:

FIG. 6A schematically illustrates the format of an event message;

FIGS. 6B and 6D schematically illustrate the correlation of event messages based on context identifiers as well as the resulting generation of a correlation graph;

FIG. 9 is a list illustrating the attributes of an embodiment of an 3GPP AlarmInformation object; and FIG. 10 is a list illustrating the attributes of an embodiment of a 3GPP performance measurement object.

DETAILED DESCRIPTION

In the following, for purposes of explanation and not limitation, specific details are set forth, such as specific apparatus configurations, specific flow diagrams and specific signalling scenarios in order to provide a thorough understanding of the technique disclosed herein. It will be apparent to one skilled in the art that this technique may be practised in other embodiments that depart from these specific details. The skilled artisan will appreciate, for example, that the technique discussed herein is not limited to communication systems according to the 3GPP specifications exemplarily discussed hereinafter.

Those skilled in the art will further appreciate that the methods, steps and functions explained herein may be implemented using individual hardware circuitry, using software functioning in conjunction with a programmed micro processor or a general purpose computer, using one or more Application Specific Integrated Circuits to (ASICs), one or more Digital Signal Processors (DSPs) and/or one or more Field Programmable Gate Arrays (FPGAs). It will also be appreciated that the technique disclosed herein may be embodied in a processor and the memory coupled to the processor, wherein the memory stores one or more programs that perform the steps discussed herein when executed by the processor.

Figure 2:
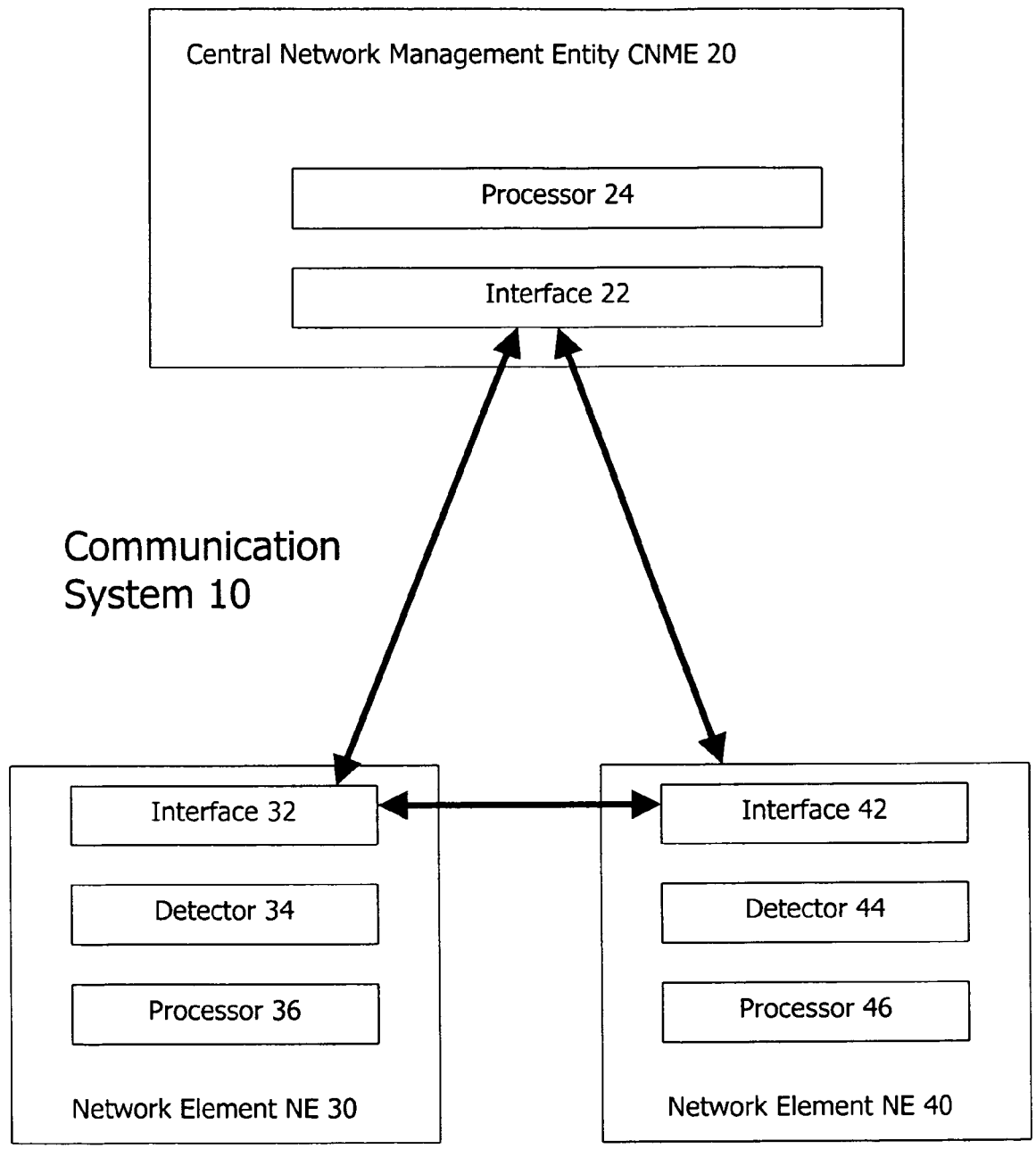
FIG. 2 schematically illustrates embodiments of network elements adapted to generate event messages as well as an embodiment of a network management entity adapted to determine a correlation among the events reported by the network elements.

FIG. 2 illustrates an embodiment of a communication system 10 in which the technique presented herein may be implemented. The communication system 10 comprises a Central Network Management Entity (CNME) 20 as well as multiple Network Elements (NEs) 30, 40. The NEs 30, 40 are adapted to communicate with each other and with the CNME 20 as indicated by arrows.

The CNME 20 may be located in a core network portion of the communication system 10. As an example, the CNME 20 may be located on an operation and management (O&M) site of a network operator.

The network elements 30, 40 may be located in the core network portion or an access network portion of the communication system 10. As an example, one or more of the NEs 30, 40 may be realized by a base station (such an eNodeB) of a Long Term Evolution (LTE)-compliant or any other access network. Alternatively, or in addition, one or more of the NEs 30, 40 may be realized by a stationary or mobile terminal, such as a mobile telephone, smart phone, network card or stick, or PC. Still further, one or more of the NEs 30, 40 may be realized in the form of a network router, network switch, and so on.

Figure 1:
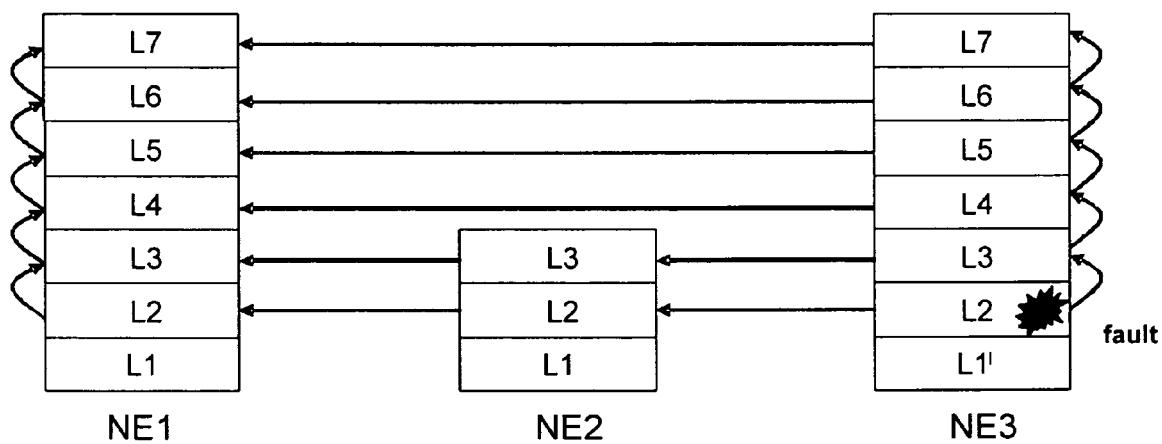
FIG. 1 schematically illustrates the vertical and horizontal propagation of a fault through protocol stacks of different network elements.

Each of the NEs 30, 40 may have a protocol stack with one or more network layers as illustrated in FIG. 1. For example, the NE 30 of FIG. 2 may correspond to NE 3 in FIG. 1, and NE 40 in FIG. 2 may correspond to any one of NE 1 and NE 2 in FIG. 1.

As illustrated in FIG. 2, the CNME 20 comprises an interface 22 adapted to receive event messages from the NEs 30, 40. In a similar manner, each NE 30, 40 comprises an interface 32, 42, respectively, adapted to report event messages towards the CNME 20. Additionally, the interfaces 32, 42 of the network elements 30, 40, respectively, permit to exchange various kinds of messages and signalling between the NE 30 and the NE 40.

An event message pertaining to an event reported by a particular NE 30, 40 may generally conform to any existing specification such as 3GPP TS 32.111-2 (Alarm Integration Reference Point), 3GPP TS 32.404 (Performance Management), IETF standard RFC 3877 (Alarm Management Information Base), ITU-T recommendation X.733—02/92 (Information Technology-Open-Systems Interconnection-Systems Management: Alarm Reporting Function) and TMF, OSS/J (see Multi Technology Operation Systems Interface, or MTOSI, specification at www.tmforum.org).

In the present embodiment, an event message signals occurrence information for a specific event. The occurrence information comprises one or more multiple context identifiers describing an internal communication state of a communication entity in which the event occurred at a time when the event occurred. The communication entity may be any entity in which an event (such as a fault, an alarm or a performance-related action) potentially giving rise to one or more secondary events may occur. As an example, a communication entity may be any of the NEs 30, 40 as such. Additionally, or in the alternative, a communication entity may be any component of the NEs 30, 40, including hardware components, software components or combinations thereof. Still further, communication entity may be a network protocol layer (as illustrated in FIG. 1) or a network interface of any of the NEs 30, 40. The internal communication state that is described for the communication entity by the one or more context identifiers may relate to any parameter of the communication entity effected by the event or of a communication entity associated with the communication entity effected by the event (e.g., a peer thereof).

Returning to FIG. 2, the CNME 20, in addition to the interface 22, comprises a processor 24 adapted to determine a set of correlated events linked by identical context identifiers. The processor 24 may further be adapted to carry out one or more additional processing operations, such as determining a root event from a set of correlated events as will be described in more detail below.

The NE 30 comprises, in addition to the interface 32, a detector 34 as well as a processor 36. The detector 34 is adapted to detect occurrence of a (local) event in a communication entity of the NE 30. The processor 36 is adapted to determine occurrence information comprising one or more context identifiers describing the internal communication state of the communication entity in which the event occurred at the time when the event occurred. The processor 36 is further adapted to generate an event message configured to signal the occurrence information, via the interface 32, towards the CNME 20.

In the embodiment illustrated in FIG. 2, the NE 40 has a similar configuration as the NE 30, thus comprising a detector 44 and a processor 36 in addition to the interface 42. It should be noted that in other embodiments, the NE 40 may not have any event detection and event reporting functionalities and act as conventional peer NE 40 from the perspective of the NE 30.

Figure 3:
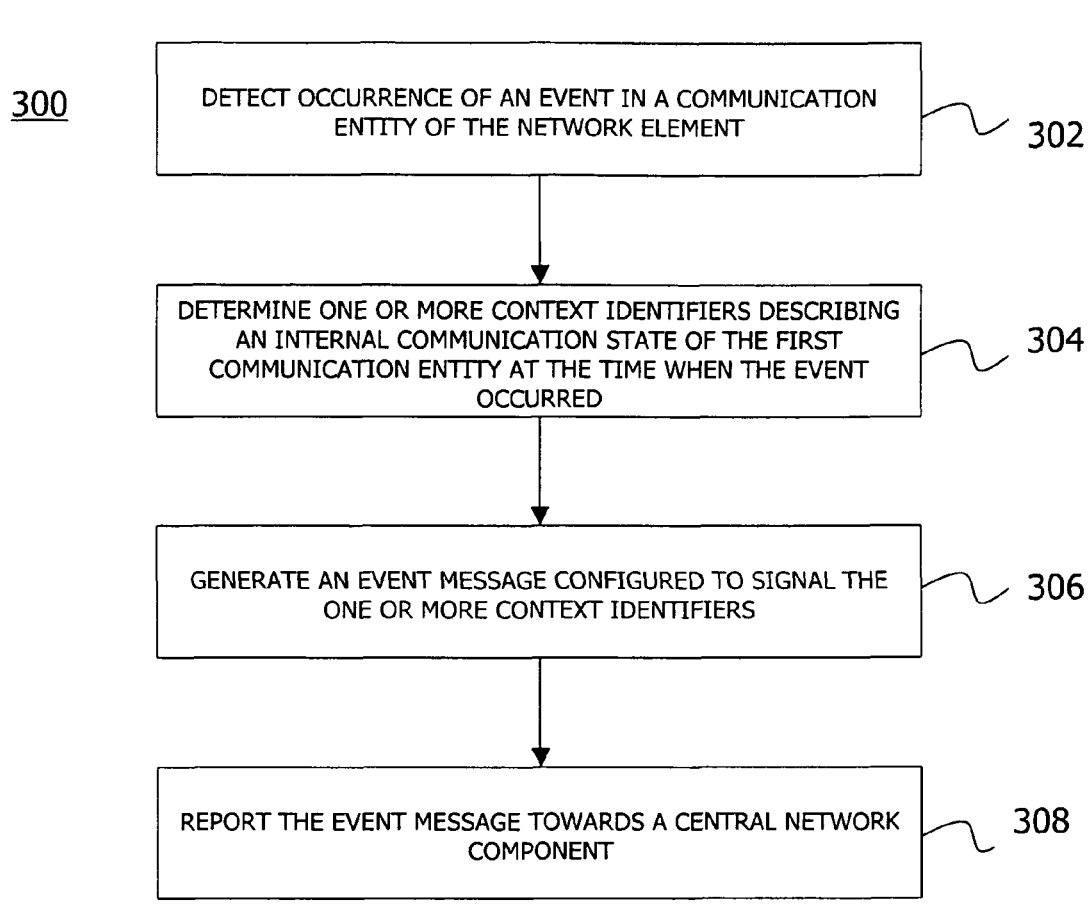
FIG. 3 shows a flow diagram illustrating a method embodiment of generating and reporting an event message.
Figure 4:
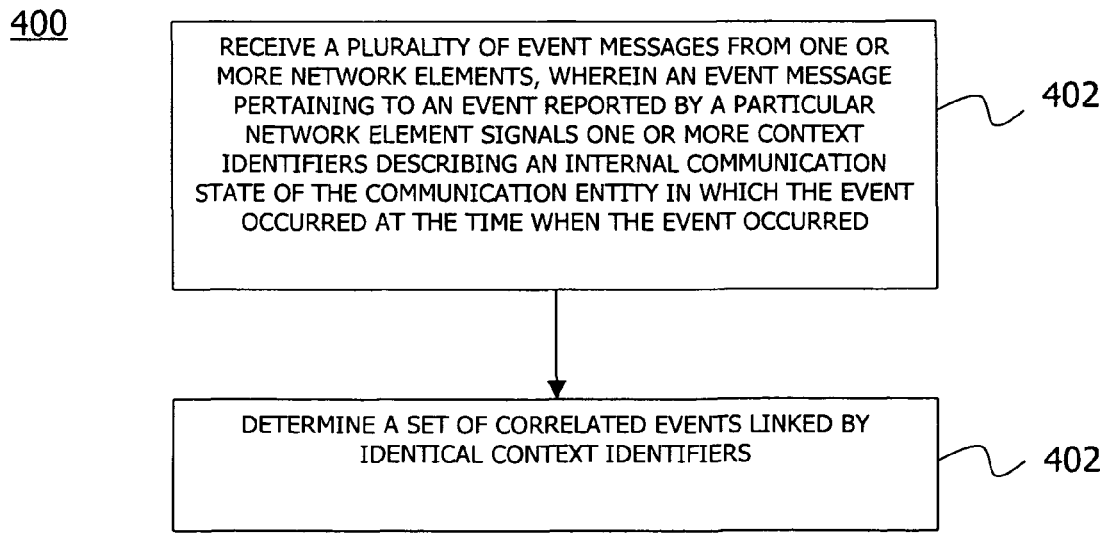
FIG. 4 shows a flow diagram illustrating a method embodiment of determining a correlation among the events associated with plurality of event messages.

In the following, the operation of the NE 30, the NE 40 and the CNME 20 in the context of event reporting and event correlation will be described with reference to the flow diagrams 300, 400 of FIGS. 3 and 4. As the NE 40 is configured to operate in a similar manner as the NE 30, only the operation of the NE 30 will be described in more detail.

The operation of the NE 30 starts in step 302 with detecting occurrence of an event in a communication entity of the NE 30 by the detector 34. The event could be a fault associated with an alarm that occurs in a specific protocol layer of a protocol stack of the NE 30 (as illustrated in FIG. 1 for NE 3). The specific protocol layer thus constitutes the communication entity in which the event occurred.

In a next step 304, the processor 36 determines occurrence information comprising one or more context identifiers describing an internal communication state of the communication entity at the time when the event occurred. Each context identifier may take the form of a name-value pair or any other data structure suitable to convey, in the present embodiment, a context type indication on the one hand and a related context identification value on the other. Generally, the communication state of the communication entity may be described by one or more of the following context type indications (and associated context identification values):

User Context

The context type indication may be indicative of a user context, such as a User Equipment (UE) context. In this realization, the related context identification value may be the identifier of the UE which the given event is related to. If, for example, the NE 30 is realized by an eNodeB or a Mobility Management Entity (MME) that experiences a fault when performing any action for a specific UE, a corresponding context identifier of the context type indication "user context" may be included in the occurrence information for the specific fault (and associated alarm). The corresponding context identifier may be supplemented with a related context value indication for the particular UE, such as the associated International Mobile Subscriber Identity (IMSI), International Mobile Equipment Identity (IMEI), or S1_AP_ID (depending on whether the NE 30 is realized by an eNodeB, or in the case of LTE, an MME).

Network Cell Context

In addition or as an alternative to a context identifier of the type "user context", the occurrence information for a given event may comprise a context identifier with the context type indication "network cell context". The related context value indication may in this case be the identifier of the cell that is impacted by the event (e.g., by a fault associated with an alarm, a performance management action or a performance measurement action).

Network Element Context

Still further, the occurrence information may additionally, or alternatively, comprise the context type indication "network element context" associated with the related identifier (i.e., context identification value) of the network element (e.g., an eNodeB) which is impacted by the event.

Network Element Component Context

A network element component may be an internal board or interface of the network element impacted by the event. The corresponding context identifier that may (additionally or alternatively) be added to the occurrence information may comprise a corresponding context type indication "network element component context" together with the identifier (i.e., context identification value) of the corresponding internal component.

Network Interface Context

The context type indication "network interface context" relates to the interface connection on the side of the NE 30 to which the event is related. Depending on the particular protocol layer, the interface can be identified, for instance, by an Internet Protocol (IP) address, an (Ethernet) Medium Access Control (MAC) address, and so on as the related context identification value.

Network Protocol Context

The context type indication "network protocol context" is indicative of protocol layer generating the event. The related context identification value may be the identifier of the context that the particular protocol layer maintains on the side of the NE 30. Generally, the context identification value depends on the aggregation level on which a particular protocol layer maintains context information. As an example, context information may be maintained per user context (in which case the related context identification value may be the same as for the context type "user context" discussed above), per interface connection, and so on.

Vendor Specific Container Context

The vendor specific container context is a placeholder for which each network element vendor or network element component vendor could define one or more dedicated (e.g., non-standard) context identifiers.

It should be noted that separate context identifiers for the side of the reporting NE 30 and a peer side (e.g., NE 40) of the reporting NE 30 may be included in the occurrence information for the event reported by the NE 30. Accordingly, the occurrence information signalled by the NE 30 for an event occurring on the side of the NE 30 could also comprise context identifiers related to its peer NE 40. In particular, the following context types (and related identifications) associated with the peer NE 40 may be included in the occurrence information reported by the NE 30: network element context, network element component context, network interface context, network protocol context and vendor specific container context. For these particular context types, the related context identification values will thus relate to the corresponding identifiers on the side of the peer NE 40.

Once the occurrence information (comprising one or more context identifiers) has been determined for a specific event by the processor 36 in step 304, the processor 36 generates an event message in step 306. The event message may be generated by the NE 30 in various ways depending on the nature of the event and of the communication system. The event message is configured to signal the occurrence information and will generally include a set of context identifiers.

As mentioned above, a particular event message may signal at the same time at least one first context identifier relating to one or more communication entities (e.g., protocol layers or interfaces) of the reporting NE 30 and one or more second context identifiers relating to a communication entity of the NE 40 on the peer side. Corresponding information regarding the one or more second context identifiers may be obtained by the NE 30 in various ways. As an example, the one or more second context identifiers may be obtained by the NE 30 during a context setup process and/or a configuration process from the CNME 20 or during a context exchange process (directly) from the NE 40. Alternatively, the CNME 20 may determine the one or more second context identifiers relating to the NE 40 locally upon receipt of an event message from the NE 30, wherein the event message (only) includes the one or more first context identifiers relating to the NE 30.

Once the event message has been generated by the processor 36 in step 306, it is reported, via the interface 32 of the NE 30, towards the CNME 20 for event correlation in step 308.

The operation of the CNME 20 in the context of event correlation will now be described in more detail with reference to flow diagram 400 of FIG. 4. In an initial step 402, the CNME 20 receives, via the interface 22, a plurality of event messages from typically a plurality of network elements such as the NE 30 and the NE 40 illustrated in FIG. 2.

For an event vertically propagating through a single network element (such as through the protocol stack of the NE 30), the CNME 20 will receive a plurality of event messages from a single network element, wherein the event messages relate to different communication entities (e.g., protocol layers) of this network element. On the other hand, for an event horizontally propagating through multiple network elements (such as NE3, NE2 and NE1 in FIG. 1 or NE 30 and NE 40 in FIG. 2), the CNME 20 will receive event messages for correlated events from different network elements. Often, an event propagates both horizontally and vertically, so that the CNME 20 will receive for a given root event multiple event messages from one and the same network element as well as multiple further event messages from different network elements.

The CNME 20 collects the event messages received in step 402 and, continuously or discontinuously, determines one or more sets of correlated events in step 404. Two events are regarded as being correlated in case they are linked by identical context identifiers. Such a linking may occur via a direct link or an indirect link. For event messages indicating for a specific event two or more context identifiers, correlated events that are linked indirectly include events with non-identical context identifiers that are linked via one or more intermediary events by a chain of identical context identifiers as will be discussed in more detail with reference to FIG. 6B below.

As has been discussed above, the occurrence information reported by the NE 30 to the CNME 20 may provide correlation information pertaining to a peer of the NE 30, such as the NE 40. Such information about the peer side may, together with corresponding information about the source side (i.e., NE 30), convey an overall protocol layer context for the CNME 20. While many of the context information listed above can be determined locally by the NE 30 impacted by the event, context information pertaining to the peer side will have to be obtained, either by the NE 30 or the CNME 20, in a separate procedure. In the following, three exemplary procedures for distributing context identifiers or related information within the communication system 10 of FIG. 2 will be explained in more detail with reference to FIGS. 5A, 5B and 5C. As understood in the context of FIGS. 5A, 5B and 5C, context information may generally include one or more context identifiers.

Figure 5A:
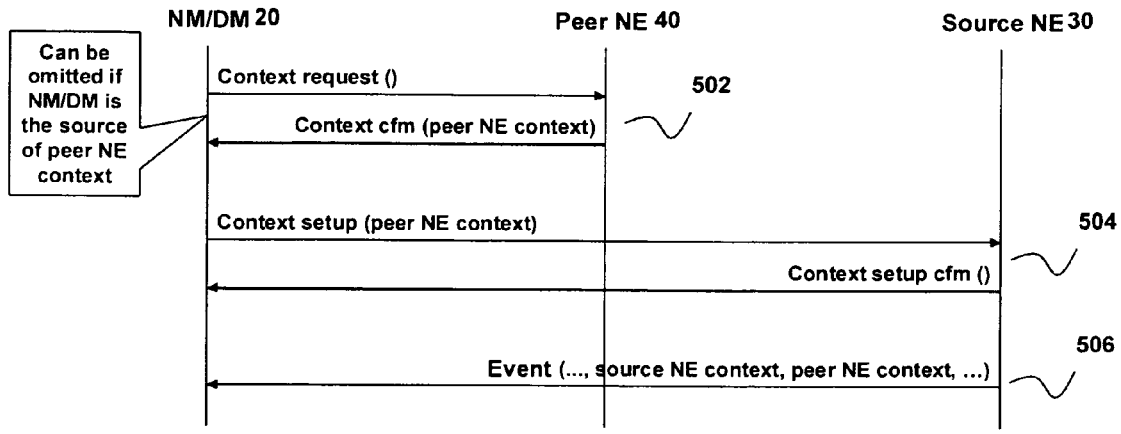
FIGS. 5A to 5C show signalling diagrams that illustrate the determination of context identifiers pertaining to a peer network element.

FIG. 5A illustrates a centralized context distribution approach in which the CNME 20 (or an associated Domain Manager, or DM) has knowledge on how the individual NEs 30, 40, . . . are connected and related to each other within the communication system 10. The approach illustrated in FIG. 5A involves a context set up or configuration process.

As shown in FIG. 5A, in a first request/response step 502 the CNME 20 retrieves context information pertaining to the peers of NE 30 (such as NE 40). In one implementation, the context information is retrieved from the Managed Object instances of the peer where an event can occur on the source side.

Managed Object instances are defined in the 3GPP specifications. In brief, a Managed Object instance is a network element representation for an O&M system. A Managed Object generally describes a particular network element, its attributes, and so on. For instance, there can be a Managed Object instance for an access network element such as an eNodeB, which describes the attributes of the eNodeB (such as the name and address of the eNodeB, the frequency on which it operates, its neighbour eNodeBs and so on).

Step 502 can be omitted if the CNME 20 is the source of this context information. Typically the CNME 20 configures the attributes of the network elements prior to the network going into operation, including specific attributes such as names and addresses of peer network elements, and so on. In certain scenarios, there may thus be no need to ask for the peer context of a network element by the CNME 20, as the CNME 20 may originally configure this information (and thus should have local knowledge thereof without requirement of contacting the network elements).

In a subsequent context setup/confirmation step 504, the context information pertaining to one or more peers of the NE 30 is sent to the NE 30 by the CNME 20. In response to receipt of the peer context information, the NE 30 performs a setup of all the Managed Object instances in the NE 30 which can generate an event based on the peer context information.

Upon occurrence of an event, the NE 30 then reports in step 506 an event message to the CNME 20 as described above with reference to the flow diagram of FIG. 3. The event message signals the occurrence information associated with the event, including context information pertaining to the source NE 30 and context information pertaining to one or more peer network elements such as the NE 40.

The context distribution approach illustrated in FIG. 5A is particularly useful for static network configurations (e.g., for networks in which cell and transport network configurations do not change frequently). The advantage of the approach illustrated in FIG. 5A is the fact that no additional post processing by the CNME 20 is needed when the event messages arrive in the CNME 20 (as the event messages already contain context information pertaining to both the source NE 30 and the peer NE 40). For dynamic configurations (such as UE connections) the context distribution approach discussed above will consume a substantial amount of processing capacity on the side of the CNME 20, so that a content distribution approach different from the centralized approach of FIG. 5A might be preferred. The fact that a specific context request/context setup signalling mechanism needs to be defined on the interface between the CNME 20 and the NEs 30, 40 might also be regarded in certain scenarios as a disadvantage of the centralized content distribution approach.

Figure 5B:
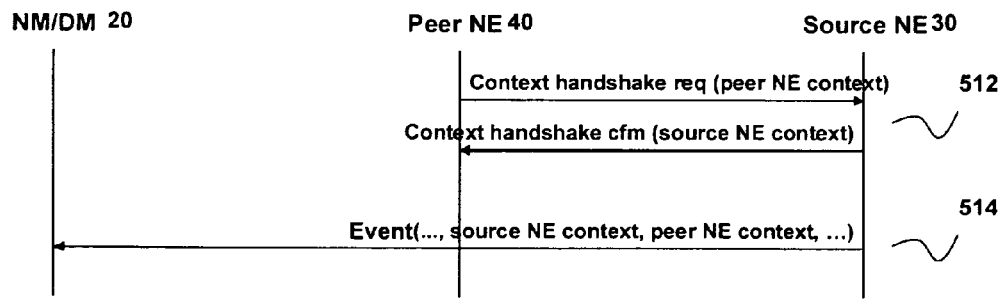

FIG. 5B illustrates a distributed content distribution approach in which the context initialization is performed in connection with the protocol interface configuration between each network element pair. Accordingly, the approach illustrated in FIG. 5B can be regarded as a context exchange process between the network elements.

As illustrated in FIG. 5B, a context handshake request/confirmation step 512 is performed between the NE 30 and the NE 40 as well as between each other pair of network elements. Signalling step 512 can either be performed based on a designated attribute of the conventional connection setup command or by a standardized or proprietary handshake signal including the necessary context information as a signal attribute. When using the connection setup command, the context information may be included, for example, in the existing signalling message of the particular protocol layer. Any event message signalled in step 514 may then comprise both context information pertaining to the source NE 30 as well as context information pertaining to the peer NE 40 as described above with reference to step 506.

The context distribution approach of FIG. 5B has the advantage that no additional post-processing on the side of the CNME 20 is needed as the event message already includes context information pertaining to the peer side of the NE 30. A new handshake signal may, however, need to be defined in some cases on the interface between the various network elements.

Figure 5C:
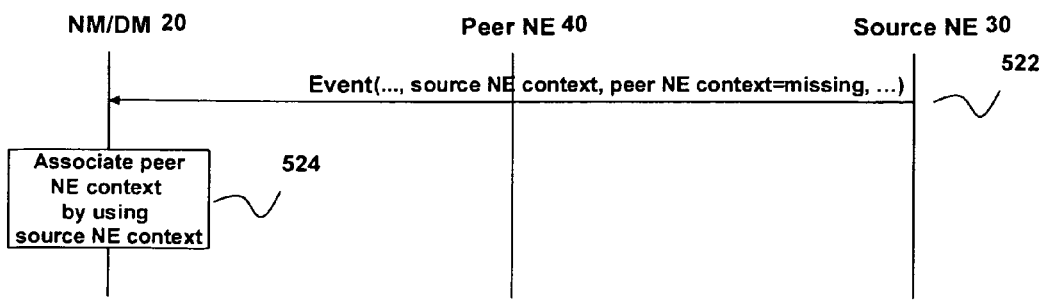

FIG. 5C illustrates an exemplary third approach for distributing context information within the communication system 10. According to the post-processing approach illustrated in FIG. 5C, the CNME 20 has knowledge on how the network elements are connected to each other within the entire communication system 10, but the context information is not initialized during the network element configuration or setup process. Rather, when an event occurs on the side of the NE 30, the NE 30 submits the event message (with the missing peer context information) to the CNME 20 in step 522. As soon as the CNME 20 retrieves the event message, it determines the missing peer context information based on the source context information included in the event message and based on stored configuration information. The stored configuration information pertaining to the peer context information may, for example, be determined by a look-up process in a configuration database of the CNME 20 based on the source context information included in the event message.

Similar to the centralized context distribution approach of FIG. 5A, the post-processing approach illustrated in FIG. 5C is particularly suitable for static network configurations. An advantage of the post-processing approach is the fact that no additional signalling between the CNME 20 and the reporting NE 30 is needed. On the other hand, post-processing has to be performed before event correlation can be started. Therefore, when events are reported, for example, in a burst-like manner and the CNME 20 needs to associate peer context information for a large number of events within a short period of time, the context distribution approaches of FIGS. 5A and 5B may be preferable over the post-processing approach of FIG. 5C.

In the following, an exemplary format of an event message as well as an associated event correlation approach as performed by the processor 24 of the CNME 20 will be discussed with reference to FIGS. 6A to 6D.

FIG. 6A illustrates an embodiment of an event message comprising an occurrence information portion and a content portion. The occurrence information portion comprises multiple context identifiers (IDs) describing an internal communication state of the communication entity in which the event underlying the event message has occurred at the time when the event occurred. In the following, it will be assumed that the communication entity in which the event occurred is a specific protocol layer L(i) of the protocol stack of NE 30. It will be appreciated that the communication entity could also be the NE 30 as such or any other component or interface thereof.

The set of context identifiers known to protocol layer L(i) is denoted with IDs_L(i). The context identifiers may be of any of the context types discussed above and may relate to the reporting NE 30 as well as to its peer NE 40. The content portion of the event message illustrated in FIG. 6A may comprise a time stamp (e.g., indicative of the point in time when the event occurred or when the event message was generated) and optionally any necessary event description and event specific values or attributes specifying further details of the event.

In sum, the event message can be represented as follows:
Event Message (IDs_L(i, content),
where IDs_L(i)={id_L(i,1), id_L(i,2), . . . id_L(i,n)} and content={time, further event details}.

In the event message embodiment illustrated above, each context identifier can be indexed by an index pair (i, j), wherein the first index (i) identifies the protocol layer or network element component issuing a particular event, while the (optional) second index (j) identifies the particular context identifier used by the given protocol layer or network element component (i). As an example, the parameter n=1 signalled by id_L(i,1) may be representative of a user context. The related context identification indication (e.g., an IMSI) is signalled by the value of id_L(i,1).

It should be noted that individual context identifiers of layer L(i) will be the same as certain context identifiers signalled for other protocol layers of the NE 30 (e.g., layer L(i+1) or layer L(i−1)) or signalled by other network elements such as the NE 40. The concept of common context identifiers signalled via different event messages permits a correlation of events reported by different components or layers of the same network element (vertical event propagation) or reported (e.g., for the same layer) by different network elements (horizontal event propagation).

FIG. 6B illustrates six correlated events represented by six different event messages M1 to M6. As shown in FIG. 6B, two event messages M(a) and M(b) and the associated events are interpreted as being correlated if they are linked by identical context identifiers. A context identifier of a first message M(a) is interpreted as being identical to a context identifier of a second message M(b) if the same context identification value id_L(i, k) is present for the same context type k of the context identifier sets of the two messages.

Events may be directly or indirectly linked by identical context identifiers. In the scenario of FIG. 6B, direct links are indicated by lines between the identical context identifiers of each message pair. As illustrated in FIG. 6B, there may also be an indirect link between correlated events via intermediary event messages (or events) by a chain of identical context identifiers. For example, in FIG. 6B message M1 is directly linked with message M2 and indirectly linked via message M2 to messages M3, M4 and M5. Via a second order indirect link involving messages M2 and M4, message M1 is also linked with message M6.

The processor 24 of the CNME 20 is configured to determine a set of correlated event messages (and thus a set of correlated events) by analysing the associated context identifiers as discussed above with reference to FIGS. 6A and 6B. Once a set of correlated events has been determined, the processor 24 is configured to generate a correlation graph as illustrated in FIGS. 6C and 6D.

As becomes apparent from FIG. 6C, a correlation graph generally comprises vertices V and edges E connecting the vertices V. Each vertex V represents a particular event (or event message) and each edge E represents a correlation between the events represented by the connected vertices V, wherein an edge E is added between two vertices V if the there is at least one identical context identifier associated with two events. Based on the relationship between the messages M1 to M6 illustrated in FIG. 6, the relation graph illustrated in FIG. 6C will thus be obtained.

Figure 6D:
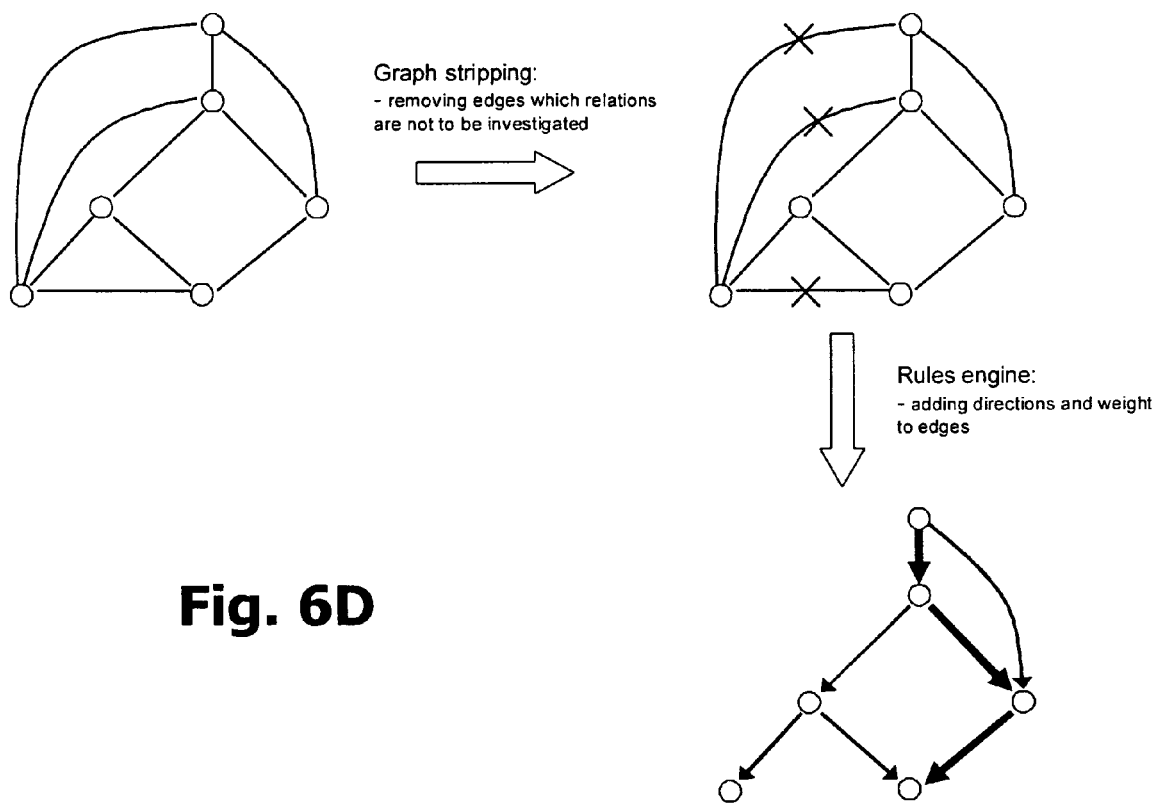

The correlation graph illustrated in FIG. 6C may be processed further by a processor 24 as illustrated in FIG. 6D. In a first step, a stripping operation may be applied to remove unimportant relations (i.e., edges). The stripping operation may depend on the particular analysis use case and could be controlled based on built-in knowledge in a correlation engine performing the correlation operation. As an example, if only the hardware fault impacts on performance are to be evaluated, edges which are associated with software-related alarm events may be omitted.

In a next step, one or multiple rules are applied to add directions and weights to the vertices. The rules may, for example, specify an order of an occurrence relationship between two events. In this regard, the time stamps included in the associated event messages may be evaluated. Any weights may be added to the vertices (and/or edges) based on the correlation strengths of each pair of correlated events. Correlation strengths may be determined based on built-in a priori knowledge in the correlation engine.

The resulting correlation graph with directed and weighted vertices may in a further step be analysed by the processor 24 for determining the root event that propagated through the various communication entities and gave rise to the secondary events. Once the root event has been determined, appropriate management actions may be initiated.

Figure 7:
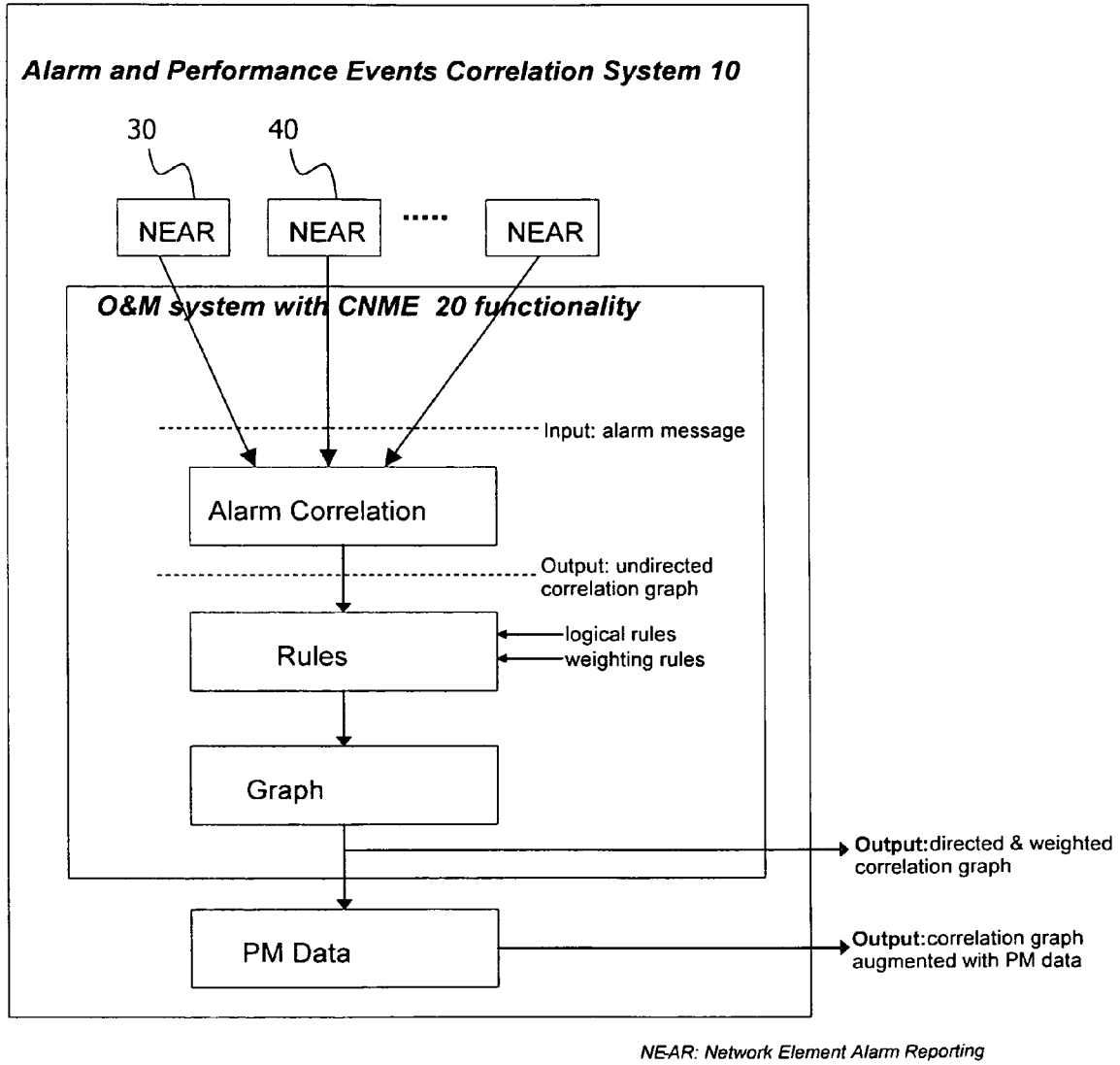
FIG. 7 schematically illustrates an embodiment of an alarm and performance events correlation system based on the communication system of FIG. 2.

In the following, an exemplary 3GPP implementation of the communication system 10 illustrated in FIG. 2 will be discussed with reference to both alarm events (see, e.g., 3GPP TS 32.111-2) and performance events (see, e.g., 3GPP TS 32.404). FIG. 7 illustrates a corresponding alarm and performance events correlation system 10 comprising multiple network elements 30, 40, etc. as well as a central O&M component 20 for alarm correlation. The alarm events are locally detected by the network elements (NE 30, NE 40, . . . ) and reported via dedicated alarm messages (see, e.g., 3GPP TS 32.111-2) to the O&M component 20 acting as CNME. Each network element comprises a network element alarm reporting (NEAR) function that acts as the logical entity in a given network element responsible for detecting a fault, generating an alarm message and labelling the alarm message with the available context identifiers for correlation purposes.

The alarm messages from the various network elements such as NE 30 and NE 40 are collected centrally by the O&M component 20 for further processing and analysis. As shown in FIG. 7 O&M component 20 comprises an alarm correlation function responsible for finding a correlation between alarm events reported by different components or different protocol layers of a given network element and also between alarm events reported by different network elements. An exemplary mode of operation of the alarm correlation function has been described above with reference to FIGS. 6A to 6C.

The output of the alarm correlation function is an undirected correlation graph that will be processed by a rules engine as discussed above with reference to FIG. 6D. The output of the rules engine is a directed and weighted graph of alarm correlations that can directly be processed for alarm root cause analysis.

The resulting alarm correlation graph can optionally be extended by correlating performance events to the alarm events using a similar context identifier matching mechanism as used for alarm event correlation. This aspect necessitates that each performance event (e.g., each performance event message or record) is augmented with context identifiers as generally discussed above. The resulting graph augmented with performance related data can be used for alarm impact analysis or for alarm prioritization purposes.

The operation of the alarm correlation function of the O&M component 20 with respect to the exemplary event message format discussed above with reference to FIG. 6A will now be explained based on the flow diagram 800 of FIG. 8.

In a first step 802, the individual alarm events (with the corresponding context identifiers) on an alarm list maintained by the O&M component 20 are taken one by one for being added as a new vertex in an existing or a new correlation graph. In a next step 804 it is determined if the alarm taken from the list in step 802 is correlated with any existing set of correlated alarms. An alarm is interpreted to be correlated with another alarm (and to belong to the same set of correlated alarms) if $id\_L(i, n)=id\_L(j, m)$ for any $(n, m)$. It should be noted that the matching process in step 804 may optionally be performed only on a subset of the available context identifiers.

If there is an existing set of correlated alarms AS(k) the next alarm is added to this set in step 806. Additionally, an edge is drawn in the graph between the vertex of the alarm newly taken in step 802 and the vertices of the remaining alarms in the alarm set AS(k). It is then determined in step 810 if the alarm list contains any further alarms to be processed. If this is the case, the method loops back to step 802, where the next alarm is taken from the list. If all of the listed alarms have been processed, the correlation operation is finished (step 812).

If it is determined in step 804 that the alarm taken in step 802 does not belong to any existing alarm set AS(k), a new correlated alarm set AS(l) is created in step 814. Then, in step 816, the corresponding alarm is added to the alarm set AS(l) and a method continues with step 810.

Figure 8:
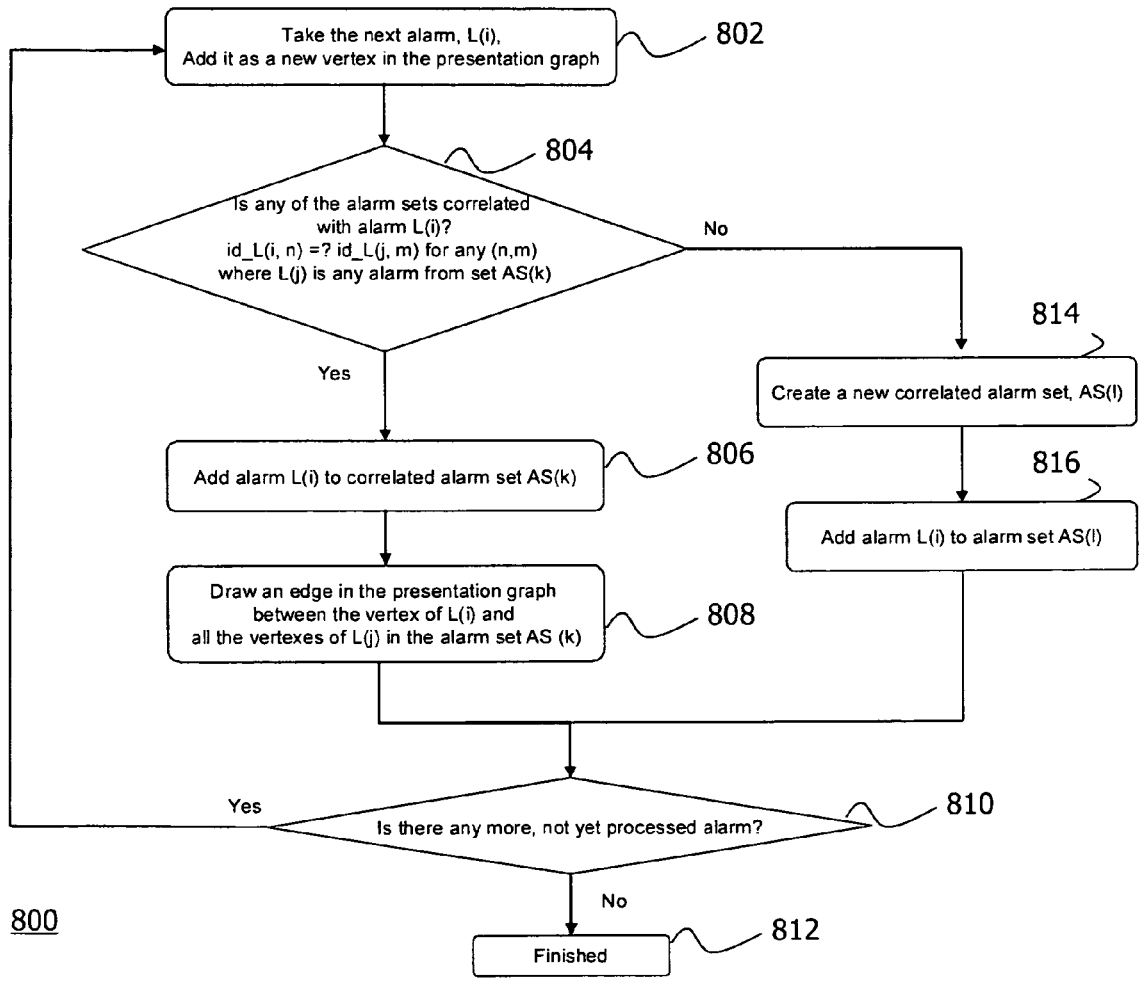
FIG. 8 shows a flow diagram illustrating a method embodiment of determining a correlated alarm set for the system embodiment of FIG. 7.

The correlations of alarm with performance events can be done in the same ways as illustrated in FIG. 8. In such a scenario, context identifiers are matched between alarms and performance events instead of between two alarms. For this reason, the performance events (including, for example, counters, key performance indicators such as received signal strengths and so on) will be generated with the same context identifiers (or at least a subset of them) as the alarm events.

In the following, an exemplary 3GPP implementation of the technique presented above will be discussed in more with respect to alarm records on the one hand and performance measurement data on the other.

As for the alarm reporting functionality, an optional attribute contextIds for the context identifiers may be added to a standardized alarm record as discussed in chapter 5.3.1.2 of 3GPP TS 32.111-2. The list embodiment illustrated in FIG. 9 includes the conventional attributes of the AlarmInformation object class plus the new attribute contextIds.

The AlarmInformation object class generally pertains to information about an alarm event that has occurred in a monitored entity (e.g., a monitored network element) and which is exchanged on the alarm IRP reference point on the interface Itf-N between IRPAgent and IRPManager as discussed in 3GPP TS 32.111-2. It should be noted that the existing attributes in the AlarmInformation object without the attribute contextIds would generally not be sufficient for correlation purposes. As an example, the attribute alarmId is used to identify a given alarm within an alarm list as invoked by a monitored entity. The alarmId attribute is unique only within the given alarm list generated by one given monitored entity, as identified by the objectInstance attribute. The notificationId attribute identifies the alarm notification that carriers the particular AlarmInformation object as contained in the alarm list. The rest of the existing attributes describes details about the alarm such as the time it has occurred, information about the particular event that has occurred, and so on.

Specifically, the identifiers available in the existing AlarmInformation object (alarmId, notificationId, objectInstance) can be used only for the unambiguous identification of the alarm, but they are not conveying any useful information regarding possible relations to other alarms, potentially generated by other monitored entities or by different components of the same monitored entity. As such, the existing identifiers are not sufficient for determining correlations among multiple alarms generated either by the same or by different monitored entities.

On the other hand, the newly defined attribute contextIds is a list of context identifiers in the form of name-value pairs (each pair comprising a context type indication parameter and related context identification value parameter) that permit alarm correlation. In the specific implementation discussed hereinafter, the use of eight name-value pairs and the use of a list structure that can hold future extensions are discussed.

The following are the names (i.e., the context type identifications) of the eight name-value pairs. There semantics have already been defined above.

User context: UE context identifier,
Network cell context: Cell identifier,
NE context: Node identifier,
NE component context: Node internal element identifier,
Network protocol context (source): Protocol context identifier—source side,
Network protocol context (peer): Protocol context identifier—peer side,
Network interface context (source): Interface identifier—source side,
Network interface context (peer): Interface identifier—peer side
Vendor specific container Proprietary id container.

The following is an exemplary expression of the eight name-values pairs in the Abstract Syntax Notation One (ASN.1) format:

```
ContextIds ::= SET {
    uEContextId UEContextId,
    cellId CellId,
    nodeId NodeId,
    nodeInternalElementId NodeInternalElementId,
    protocolContextIdSource ProtocolContextIdSource,
    protocolContextIdPeer ProtocolContextIdPeer,
    interfaceIdSource InterfaceIdSource,
    interfaceIdPeer InterfaceIdPeer,
    proprietaryIds ProprietaryIds
}
UEContextId              ::= IA5String (SIZE (0..128))
CellId                   ::= INTEGER
NodeId                   ::= IA5String (SIZE (0..128))
NodeInternalElementId    ::= IA5String (SIZE (0..128))
ProtocolContextIdSource  ::= IA5String (SIZE (0..128))
ProtocolContextIdPeer    ::= IA5String (SIZE (0..128))
InterfaceIdSource        ::= IA5String (SIZE (0..128))
InterfaceIdPeer          ::= IA5String (SIZE (0..128))
ProprietaryIds           ::= IA5String (SIZE (0..500))
```

The following is an exemplary expression of the eight name-value peers in the Interface Definition Language (IDL) format:

```
/**
 * This constant defines the name of the
 * contextIds property.
 * The data type for the value of this property
 * is ContextIds.
 */
const string CONTEXTIDS = "contextIds";
struct ContextIds {
    string uEContextId;
    long cellId;
    string nodeId;
    string nodeInternalElementId;
    string protocolContextIdSource;
    string protocolContextIdPeer;
    string interfaceIdSource;
    string interfaceIdPeer;
    string proprietaryIds;
};
```

The same contextIds attribute as defined in chapter 5.3.1.2 of 3GPP TS 32.111-2 could be added to performance measurement data generated by network elements. The performance measurement data can be counters, key performance indicators or performance management events. In order to convey this information, the performance measurement record object definitions (see chapter 2.3 of 3GPP TS 32.404) could be extended by a contextIds attribute as illustrated in FIG. 10. Possible ASN.1 and IDL expressions for the attribute have been described above.

As has become apparent from the above description of exemplary embodiments, the technique proposed herein permits the correlation of events generated is different parts of a communication system. The correlation may be performed for alarms only, performance measurement data only or for a combination of alarms and performance measurement data. The performance measurement data may originate from a user terminal (such as a UE) or from one or multiple network elements. Based on the correlated events, a data analysis function may be carried out to determine a root event (e.g., a root cause of a problem) or to evaluate the severity of an event, the impact of the event on the system performance as perceived by a user or the impact from the operator perspective.

In one realization it is possible to implement the technique only for internal aspects of a single network element so that only minimal modifications in the existing implementations are required. For example, any communication mechanisms introduced specifically for peer context information distribution can be omitted as it may be sufficient to rely on intra-network element context identifiers that are available in a specific network element, for example, via legacy protocol messages. In the minimal implementation it would be sufficient to extend the event messages (e.g., alarm reports) with suitable context identifiers anyway available in the network element and use them for event correlation purposes, possibly combined with static or semi-static configuration data available in a CMNE.

Although the embodiments discussed above focus on the 3GPP IRP specification, it is to be understood that the technique presented herein is also applicable to any other event management methodology, system or specification including the ones mentioned above.

While the technique presented herein has been described with reference to exemplary embodiments, it is to be understood that the description is for illustration purposes only. Accordingly, it is intended that the invention be limited only by the scope of the claims appended hereto.

The invention claimed is:

1. A method of determining a correlation among events occurring in one or more network elements, wherein the correlation among the events results from a propagation of a root event through communication entities of the one or more network elements, the method comprising:
receiving a plurality of event messages from the one or more network elements, wherein each of the plurality of event messages pertains to an event reported by a particular network element of the one or more network elements and signals one or more context identifiers describing an internal communication state of the communication entity in which the event occurred at the time when the event occurred, wherein the events comprise at least one of alarm events and performance events, wherein the performance events comprise at least one of a counter and a key performance indicator, and wherein at least one of the plurality of event messages indicates two or more of the context identifiers pertaining to different communication entities involved in the event; and
determining a set of correlated events, among the events occurring in the one or more network elements, that are linked by identical context identifiers, wherein each context identifier comprises a first parameter indicative of a context type and a second parameter indicative of an associated identification value, and wherein two events are determined to be correlated when event messages of the plurality of event messages associated with the two events:

(i) comprise at least one of the context identifiers of the same context type; and
(ii) have the same identification value.

2. The method of claim 1, wherein two events are determined to be correlated when the associated event messages are linked via a chain comprising one or more intermediate event messages, wherein a link between two event messages is defined by at least one context identifier of the same context type and with the same identification value in the two event messages.

3. The method of claim 1, wherein the internal communication state of the communication entity is described by one or more of the following context types:
a user context;
a network cell context;
at least one of a network element context, a network element component context, a network interface context, a network protocol context and a vendor specific container context on a side of the reporting network element; and
at least one of a network element context, a network element component context, a network interface context, a network protocol context and a vendor specific container context on a peer side of the reporting network element.

4. The method of claim 3, wherein for each context a unique identification value is defined that allows distinguishing different contexts at least locally.

5. The method of claim 1, wherein the at least one context identifier relates to a communication entity not included in or different from the network element reporting the event.

6. The method of claim 1, wherein the at least one context identifier relates to a communication entity of a network element located on a peer side of the network element reporting the event.

7. The method of claim 6, wherein the event message reported by the network element includes at least one first context identifier relating to a first communication entity of the reporting network element and at least one second context identifier relating to a second communication entity of the network element on the peer side.

8. The method of claim 7, wherein information regarding the second context identifier relating to the peer side has been obtained by the reporting network element during at least one of a context setup process and a configuration process from a central network management entity.

9. The method of claim 7, wherein information regarding the second context identifier relating to the peer side has been obtained by the reporting network element during a context exchange process from the network element on the peer side.

10. The method of claim 6, wherein the event message reported by the network element includes at least one first context identifier relating to a first communication entity of the reporting network element, and further comprising determining in response to receipt of the event message at least one second context identifier relating to a second communication entity of the network element on a peer side based on stored configuration information.

11. The method of claim 10, wherein the second context identifier is determined by a look-up process in a configuration database based on the first context identifier.

12. The method of claim 1, further comprising:
generating a correlation graph for the set of correlated events, the correlation graph comprising vertices and edges connecting the vertices, wherein each vertex represents a particular event and each edge represents a correlation between the events represented by the connected vertices, wherein an edge is added between two vertices if there is at least one identical context identifier associated with the two events;
analysing the graph to determine at least one root vertex; and
determining the at least one root event among the correlated events based on the at least one root vertex.

13. The method of claim 12, wherein the correlation graph has directed vertices.

14. The method of claim 12, wherein generating the correlation graph comprises:
generating an undirected graph from the set of correlated events; and
adding directions to the vertices by applying a set of rules to the undirected graph,
wherein each rule specifies an order of an occurrence relationship between two events.

15. The method of claim 12, wherein the event messages indicate temporal occurrence information, and wherein the vertex directions are derived from the temporal occurrence information.

16. The method of claim 12, wherein generating the correlation graph comprises:
determining correlation strengths for pairs of correlated events; and
adding weights to at least one of the vertices and edges of the correlation graph based on the correlation strengths.

17. The method of claim 1, wherein the communication entities are selected from the group comprising a network element, a network element component, a network protocol layer, and a network interface.

18. The method of claim 1, wherein the set of correlated events linked by identical context identifiers comprise both alarm events and performance events.

19. A method of generating an event message enabling determination of a correlation among events occurring in one or more network elements, wherein the correlation among the events results from a propagation of a root event through communication entities of the one or more network elements, the method being carried out in a network element and comprising:
detecting occurrence of an event in a first communication entity of the network element, wherein the events comprise at least one of alarm events and performance events, and wherein the performance events comprise at least one of a counter and a key performance indicator;
determining one or more context identifiers describing an internal communication state of the first communication entity at the time when the event occurred;
generating the event message configured to signal two or more of the context identifiers pertaining to different communication entities involved in the event; and
reporting the event message towards a central network management entity, wherein each context identifier comprises a first parameter indicative of a context type and a second parameter indicative of an associated identification value, and wherein two events are determined to be correlated when event messages associated with the two events:
(i) comprise at least one of the context identifiers of the same context type; and
(ii) have the same identification value.

20. The method of claim 19, wherein the two or more context identifiers include at least one first context identifier relating to the first communication entity of the reporting network element and at least one second context identifier relating to a second communication entity of a network element on a peer side of the reporting network element, and wherein information regarding the second context identifier relating to the peer side has been obtained by the reporting network element during:
- at least one of a context setup process and a configuration process from the central network management entity; or
- a context exchange process from the network element on the peer side.

21. The method of claim 19, further comprising: inserting the at least one context identifier in at least one of the following objects:
- an AlarmInformation record object in accordance with the 3rd Generation Partnership Project, or 3GPP, specifications; and
- performance measurement record object in accordance with the 3GPP specifications; and
- wherein generating the event message comprises inserting the at least one object in the event message.

22. A non-transitory computer-readable medium storing a computer program product comprising program code portions that, when executed on a computing device, configure the computing device to determine a correlation among events occurring in one or more network elements, wherein the correlation among the events results from a propagation of a root event through communication entities of the one or more network elements, based on configuring the computing device to:
- receive a plurality of event messages from the one or more network elements,
  - wherein each of the plurality of event messages pertains to an event reported by a particular network element of the one or more network elements and signals one or more context identifiers describing an internal communication state of the communication entity in which the event occurred at the time when the event occurred, wherein the events comprise at least one of alarm events and performance events, wherein the performance events comprise at least one of a counter and a key performance indicator, and wherein at least one of the plurality of event messages indicates two or more of the context identifiers pertaining to different communication entities involved in the event; and
- determine a set of correlated events, among the events occurring in the one or more network elements, that are linked by identical context identifiers, wherein each context identifier comprises a first parameter indicative of a context type and a second parameter indicative of an associated identification value, and wherein two events are determined to be correlated when event messages of the plurality of event messages associated with the two events:
  - (i) comprise at least one of the context identifiers of the same context type; and
  - (ii) have the same identification value.

23. A non-transitory computer-readable medium storing a computer program product comprising program code portions that, when executed on a computing device, configure the computing device to determine a correlation among events occurring in one or more network elements, wherein the correlation among the events results from a propagation of a root event through communication entities of the one or more network elements, based on configuring the computing device to:
- detect occurrence of an event in a first communication entity of the network element, wherein the events comprise at least one of alarm events and performance events, and wherein the performance events comprise at least one of a counter and a key performance indicator;
- determine one or more context identifiers describing an internal communication state of the first communication entity at the time when the event occurred;
- generate an event message configured to signal two or more of the context identifiers pertaining to different communication entities involved in the event; and
- report the event message towards a central network management entity, wherein each context identifier comprises a first parameter indicative of a context type and a second parameter indicative of an associated identification value, and wherein two events are determined to be correlated when event messages associated with the two events:
  - (i) comprise at least one of the context identifiers of the same con-text type; and
  - (ii) have the same identification value.

24. An apparatus for determining a correlation among events occurring in one or more network elements, wherein the correlation among the events results from a propagation of a root event through communication entities of the one or more network elements, the apparatus comprising:
- an interface configured to receive a plurality of event messages from the one or more network elements, wherein each of the plurality of event messages pertains to an event reported by a particular network element of the one or more network elements and signals one or more context identifiers describing an internal communication state of the communication entity in which the event occurred at the time when the event occurred, wherein the events comprise at least one of alarm events and performance events, wherein the performance events comprise at least one of a counter and a key performance indicator, and wherein at least one of the plurality of event messages indicates two or more of the context identifiers pertaining to different communication entities involved in the event; and
- a processor configured to determine a set of correlated events, among the events occurring in the one or more network elements, that are linked by identical context identifiers,
- wherein each context identifier comprises a first parameter indicative of a context type and a second parameter indicative of an associated identification value, and
- wherein two events are determined to be correlated when event messages of the plurality of event messages associated with the two events (i) comprise at least one of the context identifiers of the same context type and (ii) have the same identification value.

25. An apparatus for generating an event message enabling determination of a correlation among events occurring in one or more network elements, wherein the correlation among the events results from a propagation of a root event through communication entities of the one or more network elements, the apparatus comprising:
- an interface configured to send the event message; and
- processing circuitry configured to:
  - detect occurrence of an event in a communication entity of the network element, wherein the events comprise at least one of alarm events and performance events, and wherein the performance events comprise at least one of a counter and a key performance indicator; and
  - determine one or more context identifiers describing an internal communication state of the communication entity in which the event occurred at the time when the event occurred, generate the event message configured to signal two or more of the context identifiers pertaining to different communication entities involved in the event, and report, via the interface, the event message towards a central network component, wherein each context identifier comprises a first parameter indicative of a context type and a second parameter indicative of an associated identification value, and wherein two events are determined to be correlated when event messages associated with the two events (i) comprise at least one of the context identifiers of the same context type and (ii) have the same identification value.

* * * * *

UNITED STATES PATENT AND TRADEMARK OFFICE
CERTIFICATE OF CORRECTION

PATENT NO.        : 9,325,568 B2
APPLICATION NO.   : 13/984354
DATED             : April 26, 2016
INVENTOR(S)       : Rácz et al.

It is certified that error appears in the above-identified patent and that said Letters Patent is hereby corrected as shown below:

In the specification,

In Column 7, Line 30, delete "Circuits to" and insert -- Circuits --, therefor.

In Column 13, Line 55, delete "L(i)," and insert -- L(i), --, therefor.

In Column 14, Line 44, delete "the there" and insert -- there --, therefor.

In Column 17, Line 12, delete "side" and insert -- side, --, therefor.

In Column 18, Line 26, delete "semis-static" and insert -- semi-static --, therefor.

In the claims,

In Column 21, Line 11, in Claim 21, delete "AlarmlnformatIon" and insert -- AlarmInformation --, therefor.

In Column 22, Line 16, in Claim 23, delete "con-text" and insert -- context --, therefor.

Signed and Sealed this
Twelfth Day of July, 2016

Michelle K. Lee
*Director of the United States Patent and Trademark Office*